United States Patent Office 3,745,114
Patented July 10, 1973

3,745,114
ION EXCHANGE METHOD
Donn Lewis Dixson, East Granby, Conn., assignor to Combustion Engineering, Inc., Windsor, Conn.
Filed Aug. 18, 1971, Ser. No. 172,690
Int. Cl. B01d 15/02, 15/04
U.S. Cl. 210—33          9 Claims

ABSTRACT OF THE DISCLOSURE

A continuous ion exchange method and apparatus together with a regeneration system is described. The ion exchange material flows continuously down through an ion exchange column while the water to be treated flows continuously up through the ion exchange material. The ion exchange material in the column is continuously replenished and the depleted exchange material is withdrawn from the bottom. The depleted resin is then regenerated and intermittently transferred back to the supply of regenerated exchange material at the top of the exchange column. Means are provided in the exchange column for accomplishing the continuous introduction of regenerated exchange material and for permitting the continuous exit of treated water.

The ion exchange material may either be anion or cation exchange material or a mixture of both. In regenerating cation exchange material in the hydrogen form, the resin is first contacted with dilute acid such as sulfuric acid so as to prevent precipitation and thereafter contacted with a less dilute acid. After regeneration, the resin is washed and the wash water is used to dilute concentrated acid to the desired concentration for the regeneration process.

BACKGROUND OF THE INVENTION

Ion exchange processes are well known for the treatment of water to exchange either anions or cations or both. Conventional ion exchange systems operate on a two-stage cycle, one cycle for service or ion exchange and the other cycle for regenerating the ion exchange material. Therefore, if a continuous supply of treated water is required, it is necessary to make provisions for supplying the water during the regeneration cycle.

One prior art method of providing a continuous supply of treated water is to provide a large system including storage for treated water which is drawn from during the regeneration cycle and then replenished during the service cycle. Another method is to provide two parallel ion exchange systems with one system being on the service cycle while the other is on the regeneration cycle. Either of these techniques involves considerable expense as well as operating manhours. A further technique which has been employed is to periodically discharge the ion exchange material from the exchange column during which period the water flow through the column is discontinued. A fresh charge of ion exchange material is then introduced and the service cycle continued while the withdrawn material is regenerated. This type of operation cannot be considered continuous since there is an interruption of the water flow during the resin transfer operation.

Another problem of prior art ion exchange systems is precipitation during the regeneration process. For example, if concentrated regenerating material such as sulfuric acid is used throughout the regenerating zone, there are liable to be precipitates such as calcium sulfate which will interfere with the entire operation.

SUMMARY OF THE INVENTION

The present invention is therefore directed to a continuous ion exchange method. An object of the invention is to continuously flow water up through the resin material in an ion exchange zone while at the same time continuously moving the resin down through the zone. The resin is replaced at the top with regenerated ion exchange material while the depleted exchange material is withdrawn from the bottom.

A further object of the invention is to regenerate cation exchange material in the hydrogen form so as to prevent the formation of precipitates. This is accomplished by first contacting the resin with a dilute acid which will not cause precipitates and then contacting the resin with a less dilute acid which will complete the regeneration process. Other objects, advantages and features of the invention will be more apparent from the detailed description which follows.

DETAILED DESCRIPTION OF THE PREFERRED EMBODIMENT

Figure 1:
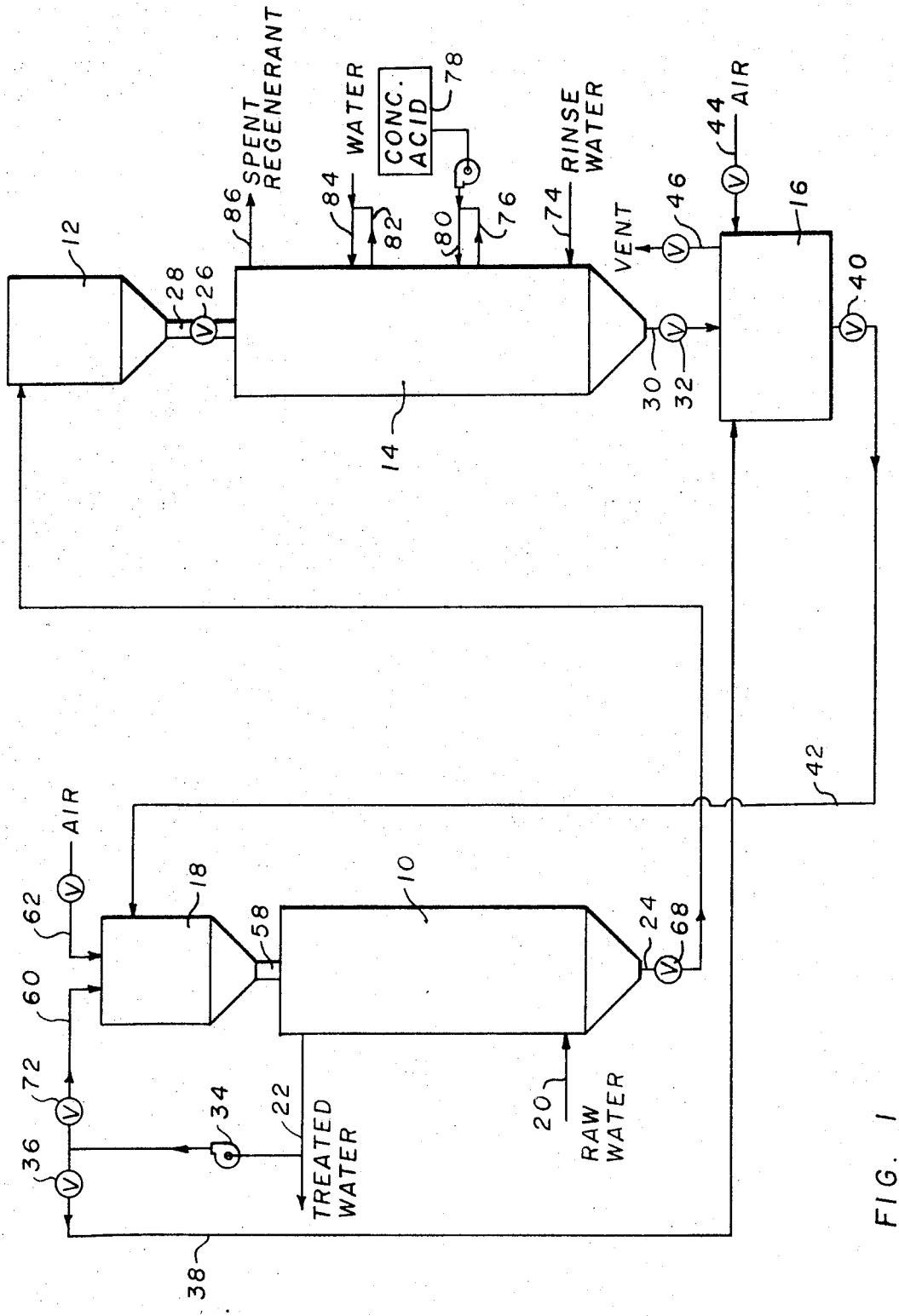
FIG. 1 is a process flow diagram for cation exchange.

FIG. 1 illustrates the system for carrying out the method of the present invention as applied to cation exchange and includes an ion exchange service column 10, an exhausted resin receiving hopper 12, a regeneration column 14, a resin catchment tank 16 and a regenerated resin receiving hopper 18. The water to be treated is introduced through line 20 into the service column 10 and flows upwardly through the resin and exits through line 22. The regenerated resin is continuously moved downwardly from the regenerated resin receiving hopper 18 into and through the service column 10. The manner in which this is accomplished will be explained hereinafter together with the details of the design of the regenerated resin receiving hopper and the service column.

The exhausted resin is periodically withdrawn from the service column 10 through line 24 and conveyed to the exhausted resin receiving hopper 12. At periodic intervals, the valve 26 in the conduit 28 between the exhausted resin receiving hopper 12 and the regeneration column 14 is opened so as to permit resin from the hopper to replace a portion of the resin in the column 14. For reasons which will be explained hereinafter, a maximum of ⅓ of the resin in the column 14 is replaced at any particular time and as a practical matter, only about ⅙ would be replaced at a time.

The fully regenerated and rinsed resin from the regeneration column 14 is conducted to the resin catchment tank 16 by means of the conduit 30 and the valve 32. A portion of the treated water from conduit 22 is withdrawn by pump 34 and conducted via valve 36 and line 38 to the resin catchment tank 16. This pressurized water supply serves to force the regenerated resin from the catchment tank through valve 40 and resin transfer line 42 into the regenerated resin receiving hopper 18. Also, air pressure may be applied to the regenerated resin in the catchment tank 16 via supply line 44 to assist in the transfer of the resin. Vent line 46 on the catchment tank 16 is for the purpose of releasing pressure in the catchment tank during periods when resin is being transferred from the regeneration column 14 to the catchment tank 16.

Figure 2:
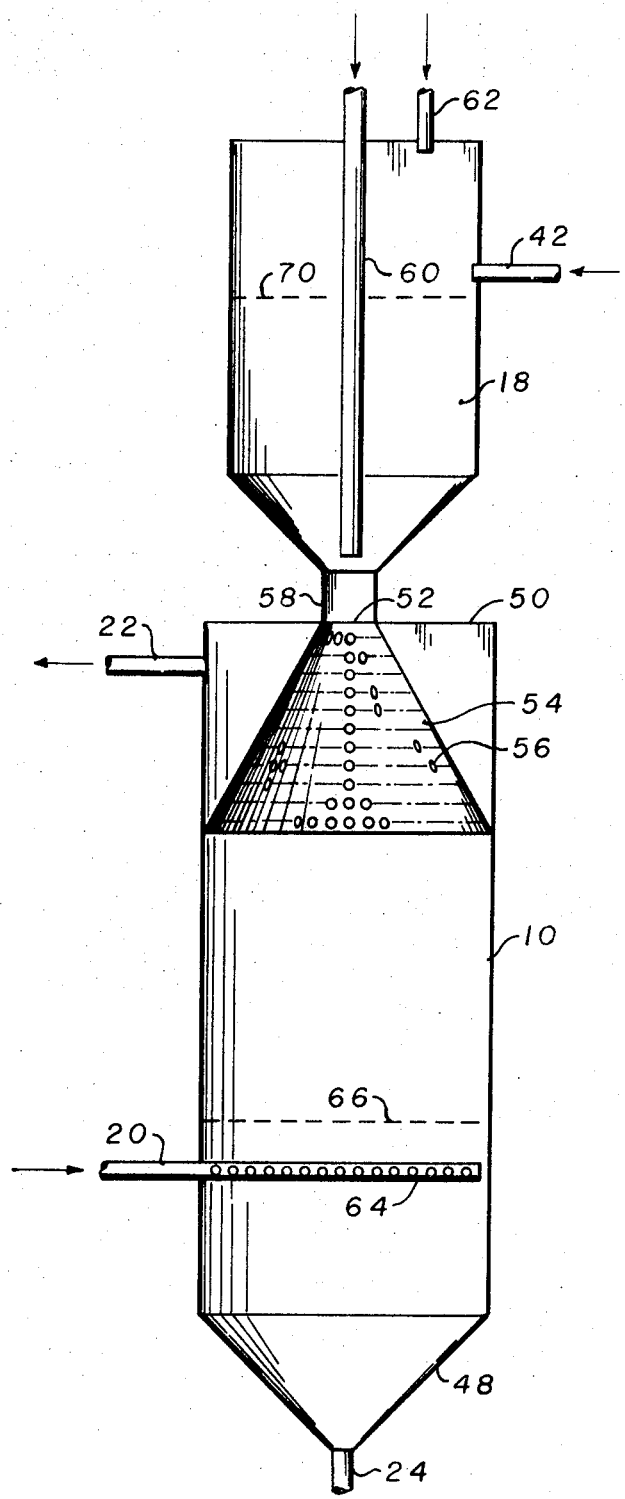
FIG. 2 is a section view of the ion exchange column and regenerated resin receiving hopper.

FIG. 2 illustrates the details of the service column 10 and the regenerated receiving hopper 18. The service column 10 is cylindrical in shape and has a conically shaped bottom 48 containing the resin outlet line 24. The top 50 of the column 10 is flat and contains an opening 52. Extending downwardly and outwardly from the periphery of the opening 52 and extending to the walls of the service column 10 is the cone 54. This cone contains a plurality of openings 56. The cone can be formed from perforated sheet material as illustrated or it can be formed from screening materials.

Extending upwardly from the periphery of the opening 52 is a conduit 58 which connects to the regenerated resin receiving hopper 18. Extending down through the center of the hopper 18 and terminating in or near the conduit 58 is a water conduit 60. Connected to the hopper 18 is an air supply line 62 and the resin transfer line 42.

The water to be treated is introduced through line 20 into a distribution header 64 located in the lower portion of the service column 10. The water flows upwardly from the distribution header 64, through the ion exchange resin, out through the openings 56 in the cone 54, and then out of the service column 10 through the exit line 22. The upward flow of water through the service column will force the ion exchange resin upwardly to maintain it in a packed condition with the apparent lower portion of the packed bed being illustrated at 66. As the resin in the service column is forced downwardly in a manner which will be explained hereinafter, the resin particles at the bottom of the packed bed will gradually fall downwardly into the conical bottom of the service column 10. After a quantity of resin has accumulated in the conical bottom, the valve 68 shown in FIG. 1 in the discharge line 24 is opened and the accumulated resin flows out of the service column.

The regenerated resin receiving hopper contains a supply of freshly regenerated resin with the level of the resin being illustrated at 70. The region in the receiving hopper and the service column between levels 66 and 70 will therefore contain a substantially solidly packed bed of resin. The water which is withdrawn from the service column discharge line 22 by the pump 34 is discharged from the water conduit 60 into the regenerated resin receiving hopper 18 or into the region between the hopper and the service column 10. The pressure and downward flow of this water causes the resin to be carried downwardly therewith thereby forcing the entire bed of resin to be moved downwardly. The air space in the resin receiving hopper 18 above the resin level 70 will inherently be at an elevated pressure due to the pressure created by the water being admitted to the service column and hopper. Additional air pressure may be applied to the top of the resin in the hopper 18 by means of the air supply line 62.

At intervals, the water supply to water conduit 60 will be interrupted by means of the valve 72 and valve 36 will be opened which will cause the resin in the catchment tank 16 to be forced through valve 40 and resin transfer line 42 into the regenerated resin receiving hopper 18. This creates the needed pressure in hopper 18 to insure the continuous flow of resin through the service column 10.

One problem which may occur with regeneration of cation resins with relatively concentrated acids is that there is liable to be precipitates formed, such as $CaSO_4$, which will interfere with the entire ion exchange process. These precipitates can cement the resin particles together and block up the resin pores. The problem is avoided by first contacting the exhausted resin with a very dilute acid so as to initially remove a portion of the cations in a dilute form whereby precipitates cannot occur. The partially regenerated resin is then contacted with a less dilute acid to complete the regeneration step after which the resin is rinsed. The method of the present invention for carrying out this three-step regeneration and rinsing technique is illustrated in FIG. 1. Rinse water is admitted through line 74 into the bottom of the regeneration column 14. The rinse water flows upwardly from a conventional distribution header and is then removed via another conventional distribution header through line 76. This discharged rinse water is then mixed with concentrated sulfuric acid from supply 78 to form the less dilute of the regenerating solutions. This regenerating solution, which will normally be about 4% acid, is admitted to the column through line 80 and it flows upwardly from a distribution header and then exits via another distribution header through line 82. In order to form the most dilute regenerating solution which is to be initially contacted with the exhausted resin, water is added to the regenerating solution withdrawn through line 82. This dilute acid having a concentration, for example, of 0.5% acid, is introduced through line 84 and flowed upwardly through the resin in the upper portion of the regeneration column 14 and then out through line 86.

Since the rinse water withdrawn from line 76 is being used to dilute the acid instead of being discharged to waste, water is being conserved and a waste disposal problem minimized.

As mentioned hereinbefore, only ⅓ of the resin in the regenerating column 14 may be replaced at any one time. This is due to the fact that there are three zones and all of the resin must be subjected to treatment in each zone. As a practical matter, even less resin will be replaced each time, perhaps ⅙, so that a complete regeneration is assured.

Figure 3:
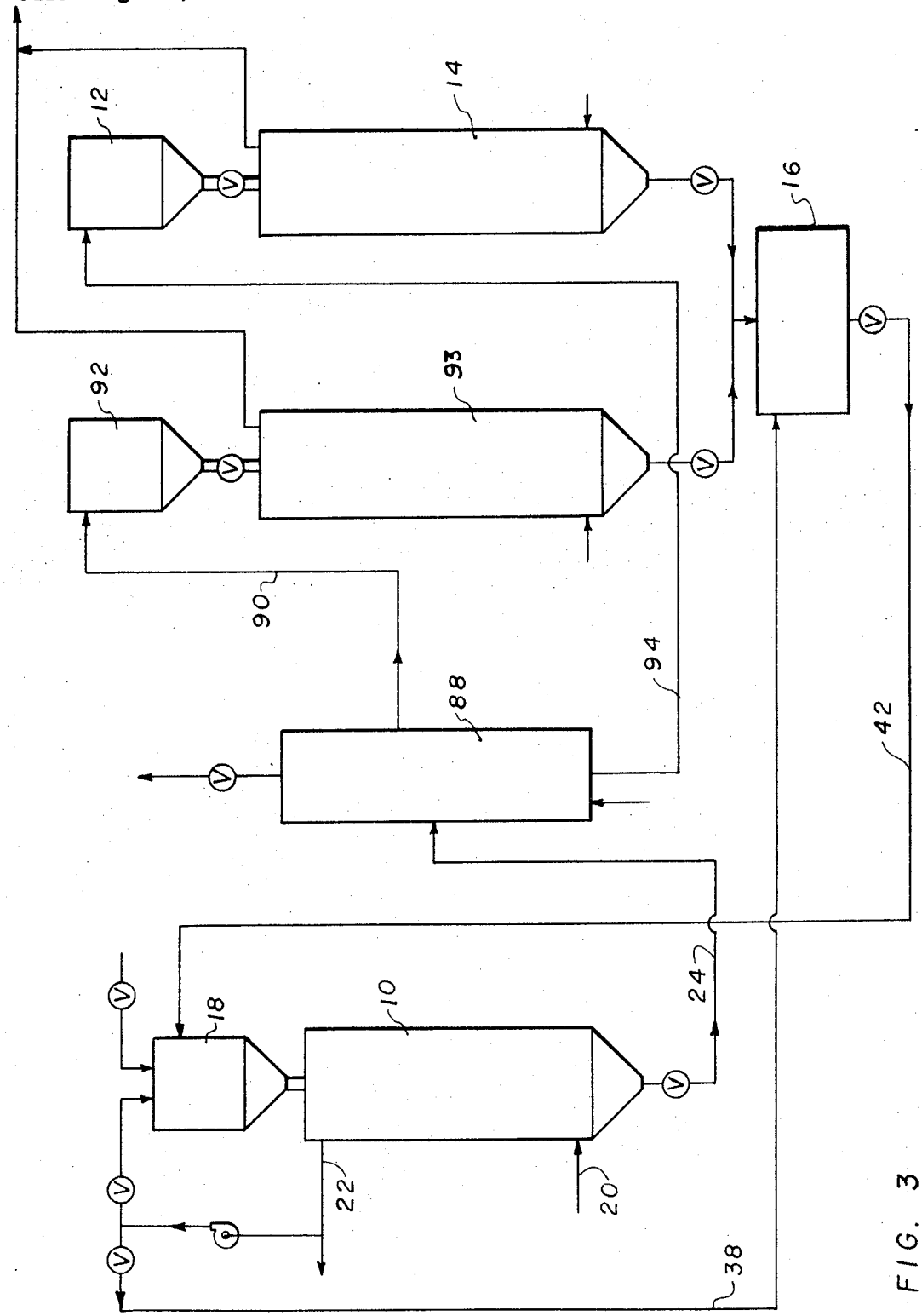
FIG. 3 is a process flow diagram of a mixed cation-anion exchange system.

FIG. 3 illustrates the present invention as applied to a mixed bed ion exchange or demineralizer system. The resin which is withdrawn from the service colmun 10 through the outlet line 24 is first conducted to the resin separation column 88. Such resin separation columns are conventional and operated by flowing water upwardly therethrough at a specified velocity which causes the two resins to separate according to density. The anion resin, which is conventionally the lighter of the two resins is then conducted via line 90 to the anion exhausted resin receiving hopper 92 while the cation resin is conducted via line 94 to the exhausted resin receiving hopper 12. The cation resin is then regenerated as previously described while the anion resin is regenerated in column 93 in a conventional manner. The regenerated anion and cation resins are then both conducted to the resin catchment tank 16 which also serves as a mixing tank for the resins. This mixing may be accomplished either by air or water agitation or by any other desired technique. The resins after being mixed are then conveyed to the regenerated resin receiving hopper 18 as previously described.

While this preferred embodiment of the invention has been shown and described, it will be understood that it is merely illustrative and that changes may be made without departing from the scope of the invention as claimed.

What is claimed is:

1. A method of treating liquids in an ion exchange column with ion exchange material comprising the steps of:
    (a) providing a quantity of ion exchange material in said ion exchange column, at least a portion of said quantity of ion exchange material in said ion exchange column defining an exchange zone;
    (b) flowing water to be treated upwardly through said ion exchange material in said exchange zone, said upwardly flowing water forcing said ion exchange material in said exchange zone upwardly to maintain said resin in a packed condition;
    (c) withdrawing treated water from the ion exchange column at the top of said exchange zone;
    (d) providing a first supply of regenerated ion exchange material above said quantity of ion exchange material;

(e) applying a substantially continuous downward force on said first supply whereby said first supply is moved substantially continuously downwardly into said exchange zone and said ion exchange material in said exchange zone is forced downwardly against the force of said upwardly flowing water whereby depleted ion exchange material will be displaced from said zone;

(f) withdrawing said displaced ion exchange material from said ion exchange column;

(g) regenerating said withdrawn ion exchange material thereby providing a second supply of regenerated ion exchage material; and (h) transferring regenerated ion exchange material from said second supply into said first supply.

2. A method as recited in claim 1 wherein the step of applying said downward force on said first supply includes the step of flowing water downwardly from said first supply into said ion exchange column.

3. A method as recited in claim 1 wherein said transferring step (h) is intermittent and comprises the steps of flowing transport water from said second supply to said first supply whereby said regenerated ion exchange material is carried along with said transport water and whereby said transport water comprises said water flowing downwardly from said first supply during said transfer step (h) and wherein said step of flowing water downwardly from said first supply when said regenerated ion exchange material is not being transferred comprises the step of introducing water directly into and down through said first supply.

4. A method as recited in claim 1 wherein said water introduced directly into said first supply and said transport water comprise portions of said withdrawing treated water from step (c).

5. A method as recited in claim 1 wherein at least a portion of said ion exchange material is in the hydrogen form and wherein regenerating step (g) comprises the steps of first contacting said withdrawn ion exchange material with a dilute acid and then with a less dilute acid thereby producing said regenerated ion exchange material, rinsing said regenerated ion exchange material with water and mixing said rinse water with concentrated acid to produce said less dilute acid.

6. A method as recited in claim 5 wherein said dilute acid comprises sulfuric acid of about 0.5% concentration by weight and wherein said less dilute acid comprises sulfuric acid of about 4% by weight.

7. A method as recited in claim 1 wherein said ion exchange material comprises both anion and cation exchange material and wherein regenerating step (g) comprises the steps of separating said anion exchange material from said cation exchange material, separately regenerating said anion and cation exchange material and mixing said regenerated anion and cation exchange material.

8. A method as recited in claim 1 wherein at least a portion of said ion exchange material is in the hydrogen form and wherein regenerating step (g) comprises the steps of first contacting a quantity of said withdrawn ion exchange material with a dilute acid in a first regeneration zone, transferring at least a portion of said quantity of withdrawn ion exchange material from said first regeneration zone to a second regeneration zone, contacting said withdrawn ion exchange material in said second regeneration zone with a less dilute acid, transferring at least a portion of said withdrawn ion exchange material from said second regeneration zone to a washing zone, contacting said withdrawn ion exchange material in said washing zone with water.

9. A method as recited in claim 8 wherein said less dilute acid is prepared by the step of mixing water from said washing zone with concentrated acid and wherein said dilute acid is prepared by withdrawing less dilute acid from said second regeneration zone and mixing said withdrawn less dilute acid with water.

References Cited
UNITED STATES PATENTS

| | | | |
|---|---|---|---|
| 2,897,051 | 7/1959 | McIlhenny et al. | 210—33 X |
| 2,528,099 | 10/1950 | Wilcox et al. | 210—33 |
| 3,595,784 | 7/1971 | Butterworth | 210—33 |
| 3,193,498 | 7/1965 | Platzer et al. | 210—33 |
| 2,744,840 | 5/1956 | Daniels et al. | 210—33 X |
| 3,595,385 | 7/1971 | Duff | 210—33 X |

SAMIH N. ZAHARNA, Primary Examiner

R. H. SPITZER, Assistant Examiner

U.S. Cl. X.R.

210—189